June 24, 1930.  A. DE SUSHKO  1,767,785
URETHRAL BOUGIE
Original Filed Jan. 19, 1927
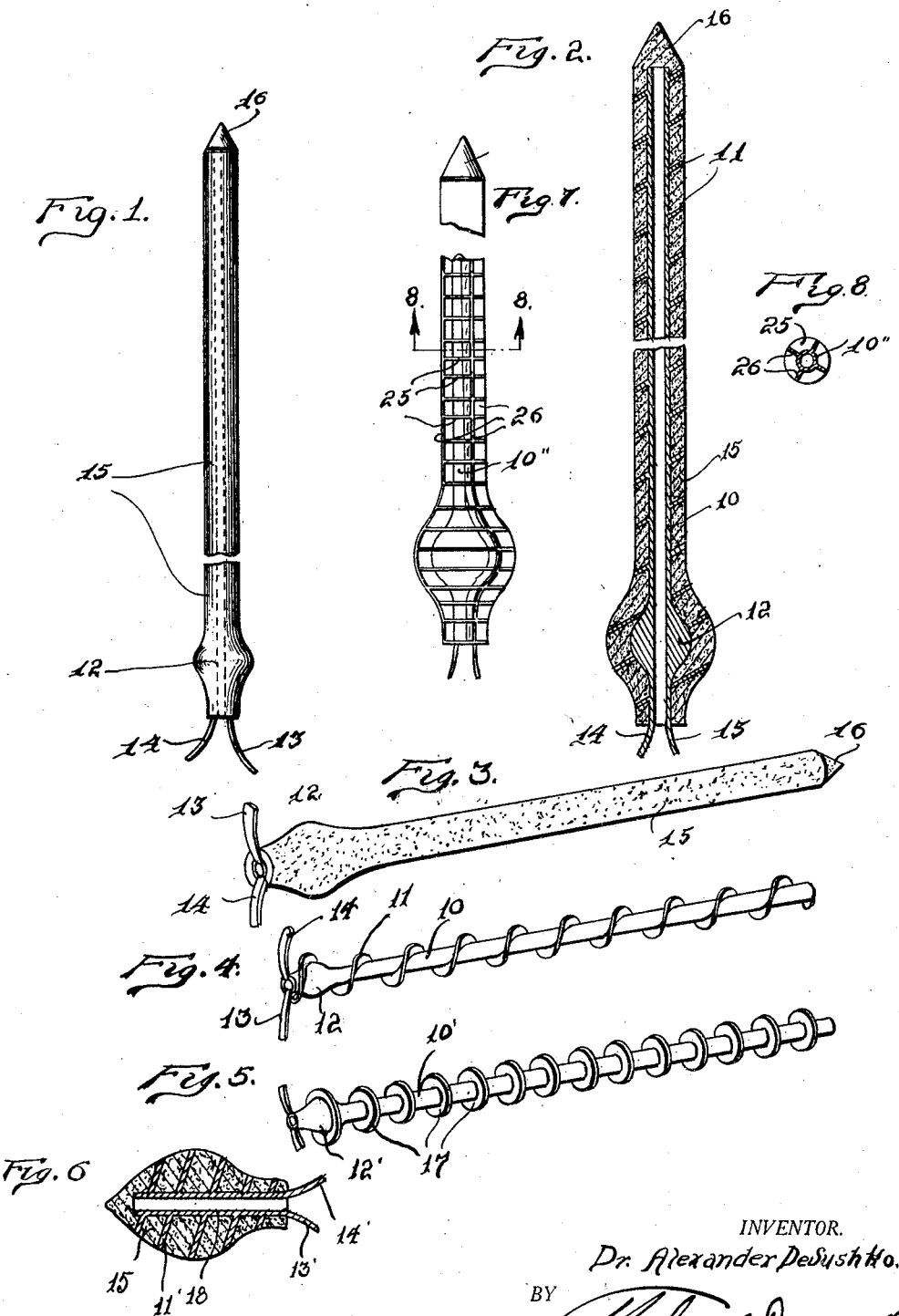
INVENTOR.
Dr. Alexander DeSushko.
BY
ATTORNEY.

Patented June 24, 1930

1,767,785

UNITED STATES PATENT OFFICE

ALEXANDER DE SUSHKO, OF CHICAGO, ILLINOIS

URETHRAL BOUGIE

Application filed January 19, 1927, Serial No. 161,987. Renewed May 12, 1930.

My invention relates to a new and useful improvement in a urethral bougie, adapted for use in treating various diseases of the urethra, and the bladder, the device extending through the urethra, when desired, into the internal urinal meatus.

Various bougies have been provided for treatment of the urethra, but it is a very undesirable feature in all of these known bougies that the medicament is not retained in the urethra a sufficient length of time to permit the medicament to fully affect the injured or diseased parts, the natural urinary functions removing the medicament.

It is an object of the present invention to provide a bougie whereby a medicament may be retained in the urethra as long as desired, permitting, at the same time, the natural urinary functions, so that a more efficient bougie is provided, and a means is furnished whereby the medicament may be retained in contact with the affected parts any desired length of time.

Another object of the present invention is the provision of a bougie of this class having a tubular member extended therethrough.

Another object of the invention is the provision of a bougie of this class having a tubular member extended therethrough and provided with retaining means on its periphery for retaining medicament placed thereon.

Another object of the invention is the provision of a bougie of this class which will be flexible so as to readily conform to the contour of the parts with which used, and which may be retained in the urethra for a considerable length of time without irritation or undesirable effects on the patient.

Another object of the invention is the provision of a bougie of this class which will be flexible and elastic so as to distend and dilate the mucous membrane for an indefinite period of time and to bring the medication into direct contact with every sinus of the dilated urethra.

Other objects will appear hereinafter.

The invention consists in the combination and arrangement of parts hereinafter described and claimed.

The invention will be best understood by a reference to the accompanying drawings which form a part of this specification and in which, Fig. 1 is a central longitudinal view of the invention showing it in position in the urethra.

Fig. 2 is a central longitudinal sectional view of the invention.

Fig. 3 is a perspective view of the invention showing the medicament applied.

Fig. 4 is a perspective view of one form of tubular member used in the invention.

Fig. 5 is a perspective view of another form of tubular member used in the invention.

Fig. 6 is a central vertical sectional view of the invention utilized as a prophylactic.

Fig. 7 is a fragmentary view of a modified form of the tubular member used in the invention.

Fig. 8 is a sectional view taken on substantially line 8—8 of Fig. 7.

In forming the invention in the form shown in Fig. 4, I provide a tubular member 10 which is preferably flexible and preferably made from a very thin rubber. Wound spirally on the periphery of the tubular member, and if desired, made integral therewith, is a blade 11. At the forward end of the tube 10 there is a bulge 12 and the forward end is provided with the removing flaps 13 and 14, this tubular member 10 being open at both ends.

As shown in Fig. 2, the bulge 12 extends around the tube 10, as it is not necessary that the inside diameter of the tube 10 vary at the bulged portion, although the tube may be so constructed, if desired.

Positioned upon the tube 10 is the medicament 15 which extends outwardly as far from the tube 10 as does the blade 11, so that the tube 10 and the blade 11 may be completely covered with the medicament 15. If desired, of course the medicament 15 may be projected slightly beyond the outer edges of the blade 11.

As shown in Fig. 2, I prefer to form a tapered tip 16 of medicament on the tube, this tip 16 being of such a material as to be readily melted by the heat of the body.

In Fig. 5 I have shown the tube 10′ provided with the bulge 12′ and having on its periphery a number of discs 17 which serve as retaining members.

In Fig. 6 I have shown a tube 18 provided with the spirally arranged blade 11′ and the removing flaps 13′ and 14′, this tube 18 being covered with the medicament 15, so as to provide a short substantially elliptical member which may be used as a prophylactic, and inserted into the fossa navicularis, the removing flaps 13′ and 14′ projecting beyond the external urinary meatus.

In Fig. 7 I have shown a tube 10″ provided with a plurality of circumferentially extending partition forming members 25 and a plurality of axially extending partition forming members 26, these members serving to provide a plurality of compartments on the periphery of the tube 10″ in which the medicament may be deposited and retained.

When the device is in use, the removing flaps 13 and 14 project from the tube 10 and extend outwardly from the external urinary meatus, the bulged portion 12 lying in the fossa navicularis and the remainder of the tube extending through the urethra past Cowper's gland, past the prostate glands and reaching to the internal urinary meatus.

It is evident that when the tip 16 is dissolved, a tract through the bougie is provided for draining of the bladder, thus leaving the medicament in contact with the inner surface of the urethra throughout its length.

By having the tube flexible it will accommodate itself to various conditions which may be required, while at the same time, causing little, if any, inconvenience, to the parts being treated.

Diseases of the bladder, adjacent the internal urinary meatus, are quite common and it is believed evident that a bougie constructed in this manner affords a means for retaining the medicament around the affected parts when in this region.

The medicament generally used with bougies is commonly of an oily nature, so that the inner surface of the urethra is constantly lubricated, and the retaining members, whether composed of the blade 11, or the discs 10′ or the radially extending and axially extending partition forming members shown in Fig. 7, being in contact with the medicament, are also lubricated, so that as the medicament is reduced in amount by absorption, no uneasiness need be experienced by the patient on account of the outwardly projecting retaining members on the tube.

By having the bulge 12 formed on the tube in the manner indicated and the thickness of the medicament retained uniform at this portion so as to provide a bulge on the outer surface of the bougie, the undue removal of the bougie from the urethra is prevented.

Bougies as now known are commonly formed elastic, and the bougie described herein may be also formed from elastic medicament, and the bulge 12 with the medicament surrounding it compressed by a mechanical device prior to its insertion into the urethra, if desired.

It will be noted that the retaining members in all of the forms illustrated extend outwardly from the periphery of the tube, these outwardly extending retaining portions serving to reinforce the tube and prevent its undue collapse.

It is also believed apparent that by making the bougie shorter than illustrated in the drawings, the device may be used for treatment of the anterior urethra, and by making the bougie of the length shown in Fig. 1, the device is adapted for treatment of the posterior and anterior urethra. It is also believed evident that the device may be used for treatment either with the male or the female.

The bulged portion of the bougie resting in the fossa navicularis will resist undue outward movement of the bougie from the urethra, and the flaps 13 and 14 may also be provided at one face with an adhesive material and folded backwardly to adhere to the flesh so as to further secure the bougie in position.

By forming the bougie in this manner, the dilation of the urethra may be effected by the bougie, and the medicament retained in contact with the interior of the urethra, while it is in dilated or extended form, thus bringing the medicament into contact with all of the surface and assuring a treatment of the deep sinuses on the inner surface of the urethra.

While I have illustrated and described the preferred form of my invention, I do not wish to limit myself to the precise form of structure, shown, but desired to avail myself of such variations and modifications as may come within the scope of the appended claims.

Having thus described my invention what I claim as new and desire to secure by Letters Patent is:

1. A bougie of the class described comprising: a tubular supporting member open at both ends; and a medicament affixed to the outer surface of said supporting member.

2. A bougie of the class described comprising: a main body adapted for insertion into the urethra, said main body having an axially extending opening formed therein throughout its entire length.

3. A bougie of the class described comprising: a main body portion adapted for insertion into the urethra, said main body portion having an axially extending passage formed therein throughout its entire length; and means for maintaining said passage permanently open.

4. A bougie of the class described comprising: a main body portion adapted for insertion into the urethra, said main body portion having an axially extending passage formed therein throughout its entire length; means for maintaining said passage permanently open; and means projecting exterior of said urethra whereby said bougie may be gripped and retracted from the urethra at will.

5. A bougie of the class described comprising: a tubular member provided with a passage throughout its entire length; medicament positioned on the outer surface of said tubular member; and means for retaining said medicament on said tubular member.

6. A bougie of the class described comprising: a tubular member having a passage extending throughout its length; medicament positioned on the outer surface of said tubular member; and means for retaining said medicament on said tubular member and reinforcing said tubular member against collapes.

7. A bougie of the class described comprising a tubular member; a radially extending retaining means on the periphery of said tubular member; and medicament mounted on the periphery of said tubular member and engaging said retaining means.

8. A bougie of the class described adapted for insertion into the urethra, comprising: a tubular member; medicament mounted on the periphery of said tubular member; the contour of said medicament being enlarged at the anterior end of said bougie for occupying the fossa navicularis of the urethra.

9. A bougie of the class described adapted for insertion into the urethra, comprising: a tubular member; a bulge on the anterior end of said tubular member; medicament covering the periphery of said tubular member and said bulge; and means projecting outwardly from the periphery of said tubular member for retaining said medicament in position thereon.

10. A bougie of the class described adapted for insertion into the urethra, comprising: a tubular member; medicament covering the periphery of said tubular member; a tip on said bougie covering the posterior end of said tubular member, said tip being of material readily dissolved by the heat of the body; and means on said tubular member for retaining said medicament on its periphery.

11. A bougie of the class described adapted for insertion into the urethra, comprising: a tubular member; medicament covering the periphery of said tubular member; and a tip on said bougie covering the posterior end of said tubular member, said tip being of material readily dissolved by the heat of the body.

In testimony whereof I have signed the foregoing specification.

ALEXANDER DE SUSHKO.